Patent 3,218,330

3,218,330
PREPARATION OF 3-HYDROXYPYRIDINE
Bernard F. Duesel, Yonkers, and Santo Emmanuele, New Windsor, N.Y., assignors to Nepera Chemical Co. Inc.
No Drawing. Filed June 13, 1963, Ser. No. 287,509
4 Claims. (Cl. 260—297)

This invention relates to an improved method for the preparation of 3-hydroxypyridine by the hydrolysis of 3-pyridinesulfonic acid in an aqueous solution of alkali metal hydroxides under pressure.

Although 3-hydroxypyridine is a useful and valuable organic intermediate, it has found only limited commercial application because of high production costs. Many attempts have been made to solve the difficulties which increase production costs and references to many of these processes may be found in the literature.

One method well known to the art for the preparation of 3-hydroxypyridine is the fusion of mixed sodium and potassium salts of 3-pyridinesulfonic acid at high temperature. This method, however, has little commercial appeal since the consistent production of high quality yields of 3-hydroxypyridine has been found to be virtually impossible.

Another known method for the preparation of 3-hydroxypyridine is by fusion of the ammonium salt of 3-pyridinesulfonic acid with potassium hydroxide. The liberation of ammonia in this reaction causes frothing which renders the procedure unsuitable for plant operation. The frothing reaction mixture also contributes to the problem of uniform heating which becomes progressively worse as the batch size is increased.

Another process for the preparation of 3-hydroxypyridine is disclosed by Tyrer in U.S. Patent No. 2,407,044. This process involves passing superheated steam at about 400° C. into a mixture of reactants which consist of the sodium salt of 3-pyridinesulfonic acid, sodium hydroxide and potassium chloride. Calcium hydroxide may also be included in this mixture as an antifrothing agent. This method has not been found satisfactory for large scale operations primarily because of the difficulties involved in keeping large quantities of the mass sufficiently fluid to prevent the batch from caking. Further, when large batches of the sodium salt of 3-pyridinesulfonic acid are reacted by this process, the added calcium hydroxide is not entirely effective in preventing frothing from occurring in the reaction vessel.

Another difficulty lies in the fact that the yield of high quality 3-hydroxypyridine following the above procedures has been found to decline as the size of the batch is increased. The most likely explanation for this variation is that the temperature profile of the reaction mass during the heating and stirring of a large batch is nonuniform. Even the gradual heating of large batches of fused reactants for the period of time necessary to complete the reaction results in local superheating of the reactant mixture because of an accumulation of highly viscous molten reactant materials near the walls of the vessel.

Among the undesirable by-products formed when localized temperatures approach 300° C. are the dihydroxypyridines and in particular the 2,3 isomer thereof which is a particularly unstable by-product. While this compound is also formed at lower temperatures in smaller batches it presents much less difficulty since the quantities formed are relatively small. With large scale operations all of these difficulties and disadvantages add to the production costs of substantially pure 3-hydroxypyridine.

It is, therefore, an important object of this invention to provide a commercially feasible process which is efficient and economical for the large scale production of 3-hydroxypyridine by the hydrolysis of 3-pyridinesulfonic acid while avoiding local overheating so that the production of undesirable by-products is held to a minimum.

A further object of this invention is to provide a method for the production of 3-hydroxypyridine in high yield and purity by hydrolysis of alkali metal salts of 3-pyridinesulfonic acid in an aqueous solution under pressure.

Other objects and advantages of this invention will become apparent from the following detailed description.

It has now been found that 3-hydroxypyridine may be obtained in high yield and purity by subjecting 3-pyridinesulfonic acid as an alkali metal salt to aqueous hydrolysis under pressure and at elevated temperature. In carrying out the method of the present invention for the production of 3-hydroxypyridine by the hydrolysis of 3-pyridinesulfonic acid may be added to a mixture of alkali metal hydroxides to which demineralized water is added to form a solution of the desired concentration and the aqueous solution is then heated in an autoclave under pressure and at elevated temperature. The sulfonic acid group is thus hydrolyzed off and the 3-hydroxypyridine formed is then separated from the reaction medium.

In the process of the present invention, a high concentration of reactants is preferably employed when the solution of the alkali metal hydroxides and 3-pyridinesulfonic acid is formed in demineralized water. The charge of reactants is introduced into a pressure reaction vessel which is then sealed. Hydrolysis is effected when the pressure reaction vessel is heated to a temperature of from about 200° C. to about 300° C. and preferably to a temperature of from about 240° C. to about 260° C. The pressure in the reaction vessel varies from about 2 to about 10 atmospheres depending on the temperature employed. The time of reaction is noncritical; since the reaction is irreversible, it merely need be continued until it reaches completion. The time required will depend upon the quantity of reactants present and is a function of the alkali concentration and the reaction temperature.

After the hydrolysis of the 3-pyridinesulfonic acid is substantially complete the pressure in the reaction vessel is gradually and uniformly reduced to atmospheric pressure and an additional quantity of demineralized water is added to the reaction vessel to dilute the mixture contained therein. The quantity of water added to the reaction mixture at this point may be from about 20% by weight to about 200% by weight of reaction mixture.

The water may be added to the reaction mixture as such or as a solution with other chemicals or as an aqueous solution of and acid for adjusting the pH and the like. The diluted reaction mixture may then be subjected to a charcoal decolorizing treatment for removal of any contaminating colored materials. After filtration, the reaction mixture may then be heated to dissolve the soluble salts and then filtered again to remove any undissolved particles remaining.

A neutralizing agent such as hydrochloric acid, acetic acid or the like is then added to the filtrate and the pH adjusted to be slightly on the acid side, preferably a pH of between 5.5 and 7. A small amount of sodium hydrosulfite or the like also may be added at this point to aid in decolorizing the filtered reaction mixture. When the aqueous reaction mixture is then cooled to a temperature of from about 0° C. to about 15° C. precipitation of white crystals of 3-hydroxypyridine occurs. These crystals may be separated from the solution by any desirable means such as by filtration, the use of a centrifuge, or by merely decanting the supernatant liquid. The damp crystals may then be dried to constant weight after they have been washed with water.

If a large volume of water has been introduced into the reaction vessel after the hydrolysis has been completed a second crop of crystals may be obtained by concentrating the filtrate from the first crystallization down to about one-third the initial volume as by evaporation, cooling the concentrated solution and recovering the crystals of 3-hydroxypyridine which precipitate.

The alkali metal hydroxides usefully employed in the process of this invention to form the 3-pyridinesulfonic acid salts which are then hydrolyzed include sodium hydroxide, calcium hydroxide, potassium hydroxide and the like, used either alone or in combination with each other. The quantity of alkali metal hydroxides employed herein may vary from stoichiometric quantities up to an excess of about 20% by weight of reactants. A preferred quantity of alkali metal hydroxides is an excess of about 15% by weight of reactants. Mixtures of the alkali metal hydroxides are preferably employed, the weight ratio of which is so chosen as to achieve maximum aqueous solubility. A mixture, for example, of from about 60 to about 80 parts by weight of sodium hydroxide in combination with about 20 to about 40 parts by weight of potassium hydroxide provides a desirable ratio usefully employed herein.

In addition to effecting hydrolysis of the 3-pyridinesulfonic acid by adding the latter to a solution of the alkali metal hydroxides, the reaction may be carried out employing the mixed alkali metal salts of 3-pyridinesulfonic acid, for example, a mixture of the sodium and potassium salts of 3-pyridinesulfonic acid. However, in the preferred procedure of the present invention it is convenient to utilize 3-pyridinesulfonic acid in crude form with the latter being added to a solution of the mixed alkali metal hydroxides. A small quantity of potassium chloride, although not essential to the process of the present invention, may be usefully employed since it acts as a catalyst which functions to reduce both the reaction temperature and reaction time. In addition to potassium chloride, magnesium chloride, calcium chloride and the like may also be employed.

The following examples are included in order further to illustrate the invention.

*Example 1*

A rocker bomb is charged with 200 grams of a mixture of the sodium and potassium salts of 3-pyridinesulfonic acid in a ratio of 70:30 for sodium to potassium, 60 milliliters of water, 80 grams of technical sodium hydroxide and 10 grams of potassium chloride as a catalyst. The rocker bomb is sealed and heated at 240°–260° C. for 4 hours under a pressure of 8 atmosperes. The contents of the bomb are removed while still warm and thereafter 600 milliliters of water is added. The pH is then adjusted to 8.5 with concentrated hydrochloric acid. The solution is decolorized by treating with charcoal, heating to 98° C. and filtering to remove contaminating insoluble particles. The straw colored filtrate is neutralized with acetic acid to pH 6.8 and a small amount of sodium hydrosulfite is added to remove remaining traces of color. On cooling to 15° C. white crystals of 3-hydroxypyridine precipitate and are removed and washed sparingly with cold water. A second crop of crystals is obtained by concentration of the filtrate to one-third of the previous volume and then recovering the crystals by the procedure for separating the previous crop. The product is found to be substantially pure 3-hydroxypyridine having a melting point of 127°–129° C. The total yield obtained is 83.2% of theoretical.

*Example 2*

The procedure given in Example 1 is repeated except that 200 grams of sodium salt of the sulfonic acid is employed with a mixture of 60 milliliters of water, 80 grams of technical sodium hydroxide and 20 grams of potassium hydroxide. The product is found to be substantially pure 3-hydroxypyridine having a melting point of 127°–129° C. The total yield obtained is 84% of theoretical.

*Example 3*

The procedure of Example 1 is again repeated except that 200 grams of the sodium salt of the sulfonic acid is employed and no potassium hydroxide added. The product is found to be substantially pure 3-hydroxypyridine having a melting point of 128°–130° C. The total yield obtained is 79% of theoretical.

It is understood that the foegoing detailed description is given merely by way of illustration and that many variations may be made therein without departing from the spirit of this invention.

We claim:
1. An improved method for the preparation of 3-hydroxypyridine by hydrolysis of 3-pyridinesulfonic acid which comprises reacting 3-pyridinesulfonic acid in an aqueous solution with alkali metal hydroxides while under a pressure greater than 2 atmospheres.
2. An improved method for the preparation of 3-hydroxypyridine by hydrolysis of 3-pyridinesulfonic acid which comprises reacting 3-pyridinesulfonic acid in an aqueous solution with potassium chloride catalyst and alkali metal hydroxides while under a pressure greater than 2 atmospheres.
3. An improved process for the preparation of 3-hydroxypyridene by hydrolysis of 3-pyridinesulfonic acid which comprises reacting 3-pyridinesulfonic acid in aqueous solution with at least one alkali metal hydroxide under pressure greater than 2 atmospheres, diluting the reaction mixture with a substantial quantity of demineralized water, neutralizing the diluted alkaline solution until a slightly acid pH is reached and separating crystals of 3-hydroxypyridine from the neutralized aqueous solution.
4. An improved process for the preparation of 3-hydroxypyridine by hydrolysis of 3-pyridinesulfonic acid which comprises reacting 3-pyridinesulfonic acid in aqueous solution with a mixture of alkali metal hydroxides under a pressure of from about 2 to about 10 atmospheres, diluting the reaction mixture with water, neutralizing the diluted alkaline solution until a slightly acidic pH is reached and separating crystals of 3-hydroxypyridine from the neutralized aqueous solution.

References Cited by the Examiner

UNITED STATES PATENTS 1,880,645  10/1932  Wulff _____ 260—294.8

OTHER REFERENCES

Klingsberg: "Pyridine and Derivatives," Part III, pp. 592–4, 874 (Interscience) (1962).

WALTER A. MODANCE, *Primary Examiner.*

NICHOLAS S. RIZZO, *Examiner.*